No. 838,172. PATENTED DEC. 11, 1906.
J. H. DALES & C. C. BRAITHWAITE.
APPARATUS FOR HEATING FEED WATER.
APPLICATION FILED JULY 1, 1904.
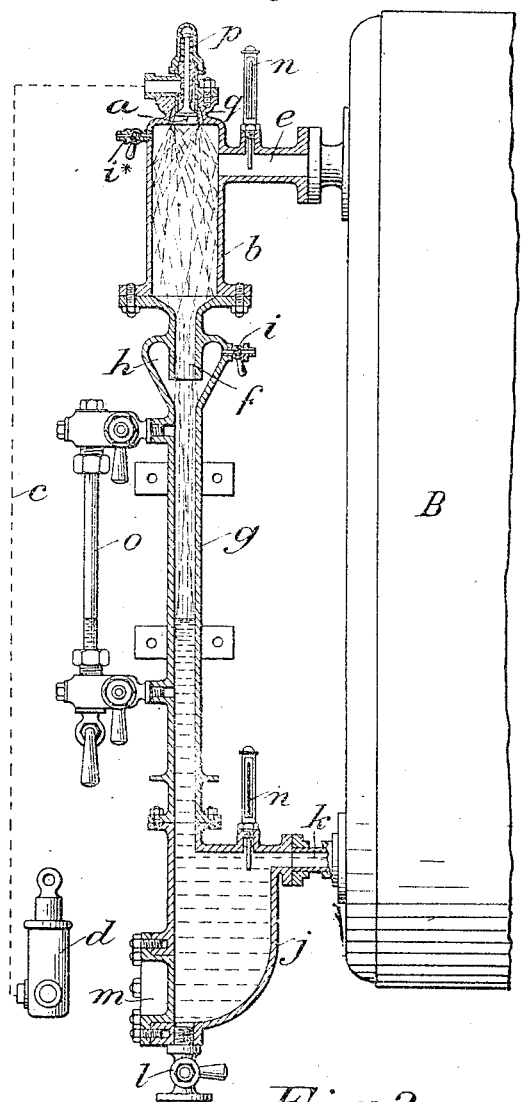
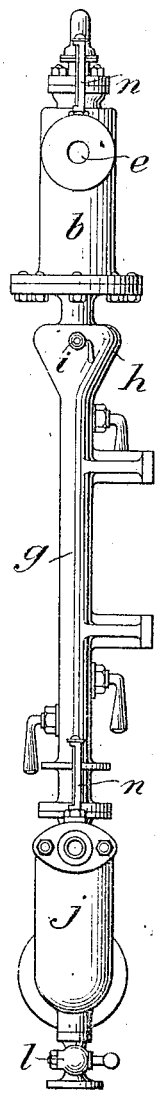
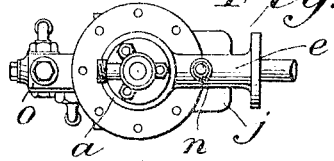
Witnesses
W. Hry Simins
E. Clough.
Inventors.
J. H. Dales
C. C. Braithwaite
per W. Lloyd Wise
Attorney.

UNITED STATES PATENT OFFICE.

JOHN HANDSLEY DALES, OF ELSTREE, AND CHARLES CHRISTOPHER BRAITHWAITE, OF HARPENDEN, ENGLAND.

APPARATUS FOR HEATING FEED-WATER.

No. 838,172.    Specification of Letters Patent.    Patented Dec. 11, 1906.

Application filed July 1, 1904. Serial No. 214,960.

*To all whom it may concern:*

Be it known that we, JOHN HANDSLEY DALES, residing at Elstree, and CHARLES CHRISTOPHER BRAITHWAITE, residing at Harpenden, in the county of Hertford, England, subjects of the King of Great Britain and Ireland, have invented Improvements in Apparatus for Heating, Deaerating, and Purifying Steam-Boiler Feed-Water, of which the following is a specification.

Objects of this invention are to raise the temperature of the feed-water of steam-boilers to approximately that of the steam which they generate before passing the feed-water into the water-space of the boilers and at the same time to deaerate the feed-water and to separate from it such matter as enters the heater with the water or is thrown down during the heating, (all of which matter is intended to be hereinafter included in the term "dirt.")

In carrying out the invention the feed-water is passed through a heating vessel which is in communication with the steam-space of the boiler and from which air given off from the feed-water is allowed to escape in such wise as to maintain a sufficient depth of practically pure steam in the vessel to insure that the water in passing through it will become properly heated. Provision may also be made for the escape of any light gases that may be given off from the feed-water. The heating vessel is interposed in the feed-water passage between the feed-pump or injector and the water-space of the boiler in a position above the water-level in the boiler, the feed-water being forced by the pump or feeder through a spraying device which finely divides the water as it descends into the boiler-steam which the heating vessel contains. The feed-water is thus very rapidly heated to the temperature of the steam, or thereabout, by the latent heat of the latter which the water absorbs, and it passes to the bottom of the heating vessel and is conducted thence to a convenient part of the water-space of the boiler, provision being made for allowing dirt to settle and collect preparatory to its discharge from the apparatus. Preferably the discharge-pipe of the heating vessel into which the feed-water is sprayed enters a vertical pipe or cylinder in which the air separates from the water, and an air-outlet valve is placed near the upper end of such pipe or cylinder to permit of the air being discharged. Preferably at the lower end of the air-separating pipe or cylinder a vessel is provided wherein dirt settles and collects, and the passage from which is so placed near the top thereof as to lead only the purer water to the boiler. A bonnet or lid is provided for convenience in removing any adhering solid matter and a blow-off valve at its lowest point for periodically clearing the loose deposit.

In the accompanying drawings, Figure 1 is a vertical section of an apparatus by which we prefer to carry out our invention, the boiler and feed-pump being also indicated. Fig. 2 is an outside plan, and Fig. 3 is an elevation of the apparatus.

$a$ is a valve for spraying into the heating vessel $b$ feed-water, which is supplied under sufficient pressure through a passage or branch $c$ from an ordinary feed-pump $d$ or injector. The vessel $b$ is supplied through a pipe $e$ with steam of the highest possible pressure from the steam-space in the boiler B. The water from the spraying-valve $a$ in falling through the steam in the vessel $b$ absorbs the latent heat of the steam without lowering its temperature in a general sense. The feed-water thus heated is conducted by a nozzle $f$ into a vertical pipe or cylinder $g$, the upper part of which forms a chamber $h$, in which air collects around the nozzle $f$, and the lower part of which is in communication with the water-space of the boiler.

$i$ is a cock or valve, which can be operated by hand or may be automatic in its action, for the purpose of releasing the air collected in the chamber $h$. The air which enters with the feed-water through the spraying-valve is of considerably greater specific gravity than the steam and accumulates in the pipe or cylinder $g$ until it rises into the air-chamber $h$. By allowing it to escape into the atmosphere or otherwise through the cock or valve $i$ from time to time or continuously it is kept down to the level of the outlet-valve $i$, and pure steam or steam containing very little air is thus maintained in the vessel $b$. In the working of the apparatus this is important, as the air can thereby be precluded from filling the chamber $b$ and steam-pipe $g$ and preventing the necessary commingling of the water-spray and steam.

In some cases the heating vessel $b$ may be provided with an escape-valve $i^\times$ for any light gases which may be given off by the water. By providing a separate escape cock or valve $i^\times$ for gases which are lighter than the steam these gases are also prevented from collecting and interfering with the commingling of the steam and water.

The feed-water after it is heated enters the lower part of the pipe $g$ and maintains a level corresponding to that in the boiler.

$j$ is the dirt-depositing chamber, the top of which is in communication with the pipe $g$ and by a lateral branch $k$ with the water-space of the boiler. Dirt sinks in the water in the vessel $g$ and the chamber $j$, and the deposit is blown out to waste periodically through a cock or valve $l$.

For convenience the chamber $j$ is provided with a mud-hole and door $m$, and thermometers $n\ n$ are provided in contact with the steam in the branch pipe $e$ and with the water in the dirt-chamber $j$. The pipe or cylinder $g$ is provided with a water-gage $o$. The thermometers serve to indicate whether the heater is working properly or not, because if the temperatures at the inlet and outlet do not approximately agree it is an indication that one or both of the escape-valves $i$ and $i^\times$ is or are furred up and that the heater does not contain only pure steam.

In the construction illustrated the spraying-valve $a$ is of inverted-mushroom form, a spring $p$ around its stem tending to keep it closed against a seat $q$, which projects slightly into a dome-shaped recess $r$ in the cover of the vessel $b$. With this arrangement an annular jet of feed-water is projected against the sides of the recess and is thus broken into very fine spray.

When the apparatus is in use, the feed-water is sprayed into the steam contained in the heating vessel $b$, and by reason of the latent heat of the steam the water is raised to the temperature, or thereabout, of the steam, the heat so absorbed by the water expanding and separating the air contained therein before or on reaching the water-level in the pipe or cylinder $g$, the air accumulating until it reaches the air-valve $i$, which is kept open to allow it to escape into the atmosphere. The heated water passes on its way to the boiler into the vessel $j$, where any matter in suspension is deposited and periodically cleared by the blow-off valve $l$ or by removal of the door $m$.

Although it may in some cases be found possible to dispense with the air-separating device or the dirt-collector, or both, we do not recommend either of these modifications.

The apparatus above described may be used for heating and deaerating feed-water by means of exhaust-steam.

We are aware that many suggestions have been made for heating feed-water by causing it to commingle with steam and also for releasing air from feed-water, and we do not claim, broadly, such an arrangement of apparatus. So far as we are aware no satisfactory arrangement has hitherto been devised, and the reason of the success of our apparatus is mainly attributable to the fact that it is provided with escape-valves fitted in such positions that within the heater a space is maintained constantly charged with boiler-steam that is free from gas or air, which space is of such a depth that the water will occupy in falling through said space a period of time sufficient to enable it to absorb the latent heat from the steam.

In a steam-boiler the transmission of heat is most rapid through those portions of the heating-surface at which evaporation is actually taking place, and if the feed-water before admission to the boiler be raised to the temperature of the steam in the boiler at portions of the heating-surface ordinarily occupied in raising the temperature of the admitted feed-water toward the temperature of evaporation actual evaporation will occur, and thus a greater amount of heat will be transmitted from the fire to the water side of the heating-surface in a given time. For this reason our apparatus has been designed with a view to enabling the feed-water to be heated to the full temperature of the live steam, and this can only be even approximately effected by maintaining a suitable depth of practically pure steam for the feed-water to pass through. The arrangement of the release-valves is thus very important. Thus if a release-valve be provided only above the water-inlet steam would be prevented by the accumulation of the heavier air from occupying the space through which the water falls. Thus the feed-water would pass to the boiler without being materially raised in temperature. Again, if no release-valve be provided at the top of the heating vessel and foul water be used light gases will accumulate and depress the level of pure steam with similar results.

What we claim is—

1. A feed-water-heating apparatus, comprising a vessel having a steam-inlet thereto, a feed-water inlet above the steam-inlet, a feed-water outlet therefrom and below said steam-inlet, and an enlarged air-collecting space surrounding the chamber and having an air-release outlet and a cock controlling said outlet.

2. Feed-water-heating apparatus comprising a vessel having a steam-inlet thereto, a feed-water inlet thereto, a feed-water outlet therefrom, below said steam-inlet and above said water-outlet, an air-release outlet, and above said steam-inlet, a light-gas-release outlet, as set forth.

3. A feed-water-heating apparatus, comprising a vessel, the upper part of which has a steam-inlet, feed-water inlet above the steam-inlet, and said chamber serving as a feed-water-heating space, an outwardly enlarged air-collecting space surrounding the middle part of the chamber and having an air-escape release-outlet a cock controlling said air-escape release-outlet, and the lower part of said chamber provided with a water-outlet and adapted to serve as a dirt-collector.

4. In feed-water-heating apparatus, the combination with a steam-boiler and a source of supply of feed-water of a vessel that extends above and below the water-level in said boiler, a communication between the upper part of said vessel and the steam-space of said boiler, a communication between the lower part of said vessel and the water-space of the boiler, which communications are adapted to keep the water-level in the vessel approximately the same as in the boiler, means for admitting feed-water to said vessel and an air-release aperture in said vessel below the communication with the boiler steam-space and above the water-level, as set forth.

5. In feed-water-heating apparatus, the combination with a steam-boiler and a source of supply of feed-water of a vessel that extends above and below the water-level in said boiler, a communication between the upper part of said vessel and the steam-space of said boiler, a communication between the lower part of said vessel and the water-space of the boiler, which communications are adapted to keep the water-level in the vessel approximately the same as in the boiler, means for admitting feed-water to said vessel, an air-release aperture in said vessel below the communication with the boiler steam-space and above the water-level, and a light-gas-release aperture in said vessel above the communication with the boiler steam-space, as set forth.

6. In feed-water-heating apparatus, the combination with a steam-boiler and a source of supply of feed-water, of a heating vessel above the level of the water in the boiler, a communication between said vessel and the steam-space of the boiler, means whereby the feed-water is passed through the heating vessel, an air-collecting chamber surrounding the heating vessel below the steam-inlet and in communication therewith, an aperture for releasing air from said chamber a cock controlling said aperture and a communication for the steam-heated feed-water between the said collecting-chamber and the boiler, the said steam and feed-water communications with the boiler being adapted to keep the water-level in the apparatus below the air-release aperture, as set forth.

7. In feed-water-heating apparatus, the combination with a steam-boiler and a source of supply of feed-water, of a heating vessel above the level of the water in the boiler, a communication between said vessel and the steam-space of the boiler, means whereby the feed-water is passed through the heating vessel, an air-collecting chamber below and communicating with said heating vessel, an aperture for releasing air from said chamber, an aperture above the steam communication for releasing light gases from said heating vessel and a communication for the steam-heated feed-water between the said collecting-chamber and the boiler, the said steam and feed-water communications with the boiler being adapted to keep the water-level in the apparatus below the air-release aperture, as set forth.

8. In feed-water-heating apparatus, the combination with a steam-boiler and a source of supply of feed-water, of a heating vessel above the level of the water in the boiler, a communication between said vessel and the steam-space of the boiler, means whereby the feed-water is passed through the heating vessel, an air-collecting chamber below and communicating with said heating vessel, an aperture for releasing air from said chamber, an aperture above the steam communication for releasing light gases from said heating vessel and a dirt-depositing vessel below said chamber and communicating therewith, a communication between said dirt-depositing vessel and the water-space of the boiler, said steam and feed-water communications with the boiler being adapted to keep the water-level in the apparatus approximately the same as in the boiler, as set forth.

9. In feed-water-heating apparatus, the combination with a steam-boiler and a source of supply of feed-water of a vessel above the level of the water in the boiler, a communication between said vessel and the steam-space of the boiler, a recess in the top of said vessel, a seat projecting into said recess and upon which the valve closes, said valve being adapted to project the feed-water in an annular jet against the walls thereof and break it up into spray, an air-collecting chamber surrounding the steam-chamber and in communication therewith and having an air-release aperture and a communication for the steam-heated feed-water between the lower part of said vessel and the water-space of the boiler, said steam and feed-water communications with the boiler being adapted to keep the water-level in the apparatus below the air-release aperture, as set forth.

10. In feed-water-heating apparatus the combination with a steam-boiler and a source of supply of feed-water of a heating vessel above the level of the water in the boiler, a communication between said vessel and the steam-space of the boiler, means whereby the feed-water is admitted to said heating vessel, an air-collecting chamber below said vessel, a pipe depending from said vessel some distance into said chamber, a valve for releasing air from said chamber, and a passage for the steam-heated feed-water between said chamber and the water-space of the boiler, said steam and feed-water communications with the boiler being adapted to keep the water-level in the apparatus below the air-release aperture, as set forth.

11. In feed-water-heating apparatus, the combination with a steam-boiler and a source of supply of feed-water of a heating vessel, a communication between said vessel and the steam-space of the boiler, a valve adapted to spray the feed-water into said vessel, an air-collecting chamber below said vessel, a pipe depending from said vessel some distance into said chamber, a valve for releasing air from said chamber, and a communication for the steam-heated feed-water between the said chamber and the boiler, said steam and feed-water communications with the boiler being adapted to keep the water-level in the apparatus below the air-release aperture, as set forth.

12. In feed-water-heating apparatus, the combination with a steam-boiler and a source of supply of feed-water of a heating vessel above the level of the water in the boiler, a communication with the steam-space of the boiler, a valve adapted to spray the feed-water into said vessel, an air-collecting chamber below said vessel, a pipe depending from said vessel some distance into said chamber, a valve for releasing air from said chamber, a dirt-depositing vessel below said chamber and communicating therewith, a communication between said dirt-depositing vessel and the water-space of the boiler, said steam and feed-water communications with the boiler being adapted to keep the water-level in the apparatus approximately the same as in the boiler, as set forth.

13. In feed-water-heating apparatus, the combination of a heating vessel, a steam-inlet thereto, means for spraying feed-water into said vessel, an air-collecting chamber below said vessel, an extension of said vessel projecting some distance downwardly into said chamber so that the latter surrounds it, a valve for releasing air from the surrounding portion of said chamber and located above the mouth of said pipe, and means for carrying off the heated feed-water and preventing it drowning the air-release valve, as set forth.

14. In feed-water-heating apparatus, the combination of a heating vessel, means for conducting steam thereto, means for spraying feed-water into said vessel, an air-collecting chamber below said vessel and in communication therewith, means for releasing air from said chamber, a passage adapted to carry off the heated feed-water and prevent it drowning the air-release valve, and thermometers in the steam-supplying and heated feed-water passages, as set forth.

15. In feed-water-heating apparatus, the combination of a heating vessel, means for conducting steam thereto, means for spraying feed-water into said vessel, an air-collecting chamber below said vessel and in communication therewith, means for releasing air from said chamber, a dirt-depositing device below said chamber and communicating therewith, a passage adapted to carry off the heated feed-water, and prevent it drowning the air-release valve, and thermometers in the steam-supplying and heated feed-water passages, as set forth.

16. In feed-water-heating apparatus, the combination of a vessel $b$, a pipe $e$ for conducting steam thereto from the steam-space of a boiler, a feed-water-spraying valve $a$, an air-collecting chamber $h$ surrounding the vessel below and in communication with the vessel $b$, a cock $i$ for releasing the collected air, and a feed-water-outlet passage $k$ communicating with the water-space of the boiler, substantially as described.

17. In feed-water-heating apparatus, the combination of a vessel $b$, a pipe $e$ for conducting steam thereto from the steam-space of a boiler, a feed-water-spraying valve $a$, an air-collecting chamber $g\ h$ below and in communication with the vessel $b$, a cock $i$ for releasing the collected air, a light gas-release valve $i^x$, and a feed-water-outlet passage $k$ communicating with the water-space of the boiler, substantially as described.

18. In a feed-water-heating apparatus, the combination of a vessel $b$, a pipe $e$ for conducting steam thereto from the steam-space of a boiler, a feed-water-spraying valve $a$, an air-collecting chamber $h$ surrounding the vessel below and in communication with the vessel $b$, a cock $i$ for releasing the collected air, a dirt-depositing device $j$, and a feed-water-outlet passage $k$ communicating with the water-space of the boiler, substantially as described.

19. In feed-water-heating apparatus, the combination of a vessel $b$, a pipe $e$ for conducting steam thereto from the steam-space of a boiler, a feed-water-spraying valve $a$, an air-collecting chamber $g\ h$ below and in communication with the vessel $b$, a cock $i$ for releasing the collected air, a light gas-release valve $i^x$, a dirt-depositing device $j$, and a feed-water-outlet passage $k$ communicating with the water-space of the boiler, substantially as described.

20. In feed-water-heating apparatus, the combination of a vessel $b$, a pipe $e$ for conducting steam thereto from the steam-space of a boiler, a feed-water-spraying valve $a$, an air-collecting chamber $g\ h$ below and in communication with the vessel $b$, a cock $i$ for releasing the collected air, a dirt-depositing device $j$, a passage $k$ between same and the water-space of the boiler, and thermometers $n$, substantially as described.

21. In feed-water-heating apparatus, the combination of a vessel $b$, a pipe $e$ for conducting steam thereto from the steam-space of a boiler, a feed-water-spraying valve $a$, an air-collecting chamber $g$ $h$ below and in communication with the vessel $b$, a cock $i$ for releasing the collected air, a light gas-release valve $i^x$, a feed-water-outlet passage communicating with the water-space of the boiler, and thermometers $n$ in the steam-inlet and feed-water outlet, substantially as described.

22. In feed-water-heating apparatus, the combination of a vessel $b$, a pipe $e$ for conducting steam thereto from the steam-space of a boiler, a feed-water-spraying valve $a$, an air-collecting chamber $g$ $h$ below and in communication with the vessel $b$, a cock $i$ for releasing the collected air, a light gas-release valve $i^x$, a feed-water-outlet passage communicating with the water-space of the boiler, a water-gage $o$ and thermometers $n$ in the steam-inlet and feed-water outlet, substantially as described.

23. In a feed-water-heating apparatus, the combination with a steam-boiler and a source of supply of feed-water, of a heating vessel, a communication between said vessel and the steam-space of the boiler, a valve adapted to spray the feed-water into the said vessel above the steam-supply, an air-outlet valve above the steam-supply, an air-collecting chamber below said vessel, a pipe depending from said vessel some distance into said chamber, a valve for releasing air from said chamber, and a communication for the steam-heated feed-water between said chamber and the boiler, said steam and feed-water communications with the boiler being adapted to keep the water-level in the apparatus below the air-release valve as set forth.

24. In a feed-water-heating apparatus, the combination with a steam-boiler and a source of supply of feed-water, of a heating vessel located in a line above the water-line of the boiler and in communication with the steam-space of the boiler, a valve adapted to spray feed-water into said vessel above the steam-supply, an air-outlet above the steam-supply, a depending pipe in communication with the lower end of said vessel and forming a water-receiving chamber, and a communication between said chamber and the boiler below the water-line.

25. In a feed-water-heating apparatus, the combination with a steam-boiler and a source of supply of feed-water, of a heating vessel located in a line above the water-line of the boiler and in communication with the steam-space of the boiler, a valve adapted to spray the feed-water into said vessel above the steam-supply, an air-outlet valve above the steam-supply, an air-collecting chamber below said vessel, a pipe depending from said vessel some distance into the chamber, a valve for releasing the air from said chamber, and a pipe communicating with the chamber and with the boiler below the water-line thereof.

26. In a feed-water-heating apparatus, the combination with a vessel, a steam-supply therefor intermediate its ends, a feed-water supply adjacent the upper end of the vessel, and an air-collecting chamber surrounding the lower end of the vessel and in communication therewith, and an air-escape cock carried by the upper end of the air-collecting chamber.

27. In a feed-water-heating apparatus, the combination with a vessel, a steam-supply therefor intermediate its ends, a feed-water supply adjacent the upper end above the steam-supply, the vessel having a contracted lower end, an air-collecting chamber surrounding the said contracted end of the vessel and in communication therewith, and an air-escape cock carried by the upper end of the air-collecting chamber.

28. In a feed-water-heating apparatus, the combination with a vessel, a steam-supply therefor intermediate its ends, a feed-water supply adjacent the upper end above the steam-supply, the vessel having a contracted lower end, an air-collecting-chamber surrounding the said contracted end of the vessel, and in communication therewith, an air-escape cock carried by the upper end of the air-collecting chamber, and the lower end of the air-chamber contracted below the contracted end of the vessel and forming a water-supply pipe.

29. In a feed-water-heating apparatus, the combination with a steam-boiler, of a vessel having its upper end in communication with the steam-space of the boiler, a feed-water supply for the vessel above the steam-supply, and said vessel having an air-collecting chamber surrounding its lower end and in communication therewith, an escape-cock carried by the upper end of the air-collecting chamber, a pipe communicating with the lower end of the vessel and with the water-space of the boiler, the said steam and feed-water communication with the boiler being adapted to keep the water-level in the apparatus below the escape-cock.

Signed at London, England, this 15th day of June, 1904.

JOHN HANDSLEY DALES.
CHARLES CHRISTOPHER BRAITHWAITE.

Witnesses:
H. D. JAMESON,
A. NUTTING.